United States Patent [19]

Gardner et al.

[11] 3,753,093

[45] Aug. 14, 1973

[54] METHOD AND EQUIPMENT FOR THE DETERMINATION OF THE DEGREE OF ABRASIVENESS OF MAGNETIC TAPE

[75] Inventors: Leslie William Gardner, Cippenham, Slough; Nicholas James Helbren, Cowley, Oxbridge; Duncan Stewart, Slough; Gwilym Iorwerth Williams, Farnham Royal, Slough, all of England

[73] Assignee: Fulmer Research Institute Limited, Buckinghamshire, England

[22] Filed: Dec. 29, 1971

[21] Appl. No.: 213,594

[30] Foreign Application Priority Data

Jan. 15, 1971 Great Britain .................... 2,080/71

[52] U.S. Cl. ............... 324/65 R, 73/7, 179/100.2 B

[51] Int. Cl. ............................................ G01r 27/02

[58] Field of Search ................................ 324/65 R; 179/100.2 B, 100.2 C; 73/7

[56] References Cited

UNITED STATES PATENTS

| | | | |
|---|---|---|---|
| 3,495,049 | 2/1970 | Humphreys et al. | 179/100.2 C |
| 2,811,691 | 10/1957 | Dahm et al. | 324/65 R |
| 2,856,582 | 10/1958 | Anderson | 324/65 R |
| 3,256,483 | 6/1966 | Broadbent | 324/65 R |
| 3,535,631 | 10/1970 | DeGeest et al. | 324/65 R |
| 3,358,495 | 12/1967 | Baist | 324/65 R X |
| 3,359,783 | 12/1967 | Scheiman et al. | 73/7 |

*Primary Examiner*—Stanley T. Krawczewicz
*Attorney*—Francis C. Browne et al.

[57] ABSTRACT

A method is described for the determination of the degree of abrasiveness of magnetic tape which method comprises passing the magnetic tape over the working surface of a simulated recording head fabricated of an electrically non-conducting material and geometrically closely approximating the dimensions of an actual recording head, the working surface of the simulated head having deposited thereon one or more thin strips of a magnetic alloy similar to the magnetic alloy used for the actual head, and observing the increase in electrical resistance of the magnetic alloy strip or strips. A device suitable for use in the method is also disclosed.

10 Claims, 6 Drawing Figures

PATENTED AUG 14 1973

3,753,093

METHOD AND EQUIPMENT FOR THE DETERMINATION OF THE DEGREE OF ABRASIVENESS OF MAGNETIC TAPE

This invention relates to a method, and equipment, for the prediction of the degree of abrasiveness in service of magnetic tapes used for the recording and reproducing of data and for other purposes.

Such magnetic tapes, which consist of a dispersion of a magnetic powder applied to a flexible filamentous substrate, in use pass over a recording and/or reproducing head, in plan consisting essentially of one or more insulated rectangular-section strips of magnetic alloy, countersunk parallel to the direction of motion of the tape within a matrix, thus providing if necessary for several independent channels. In such use, a major problem is the attrition, by the granular magnetic layer applied to the tape, of the magnetic alloy in the recording head over which the tape passes, thus necessitating unduly frequent replacement of the recording head.

The rate of abrasion of recording heads in service is known to vary and attempts have been made to correlate this variation with such factors as tape components and speed of movement. However, attempts to quantify any such relationships in order to predict the service of recording heads have hitherto been unsuccessful, either because of a lack of a reasonable degree of simulation between an accelerated test method and actual service conditions, or on account of the need for an unduly long test period, it being borne in mind that a service life of at least 1,000 operating hours is desirable although replacement after as little as 200 hours' service is known to be occasionally necessary in practice.

We have now developed an accelerated test method and equipment therefor, which rapidly gives a quantitative index of the rate of abrasion of a recording head by magnetic tape, under conditions closely simulating actual operation. The method depends upon the measurement of the rate of increase in electrical resistance of one or more thin strips of a magnetic alloy, substantially similar to a magnetic alloy as used in recording heads, when magnetic tape is passed thereover, the increase in electrical resistance of the strips being brought about by depletion of the alloy due to the abrasive action of the tape.

Normal operating conditions are simulated by providing the strips of magnetic alloy on the working surface of a geometrically simulated recording head, shaped closely to resemble an actual recording head, and by passing the magnetic tape to be tested over the working surface substantially at a normal operating speed. It is evidently of particular importance that the working surface of the simulated recording head should possess substantially the same dimensions and contours as the working surface of the actual head if normal operating conditions are to be closely simulated.

SUMMARY OF THE INVENTION

Accordingly the present invention provides a method for the determination of the degree of abrasiveness of magnetic tape, particularly the degree of abrasiveness with respect to an actual recording and/or reproducing head or the like, which method comprises passing the magnetic tape substantially at a normal operating speed over the working surface of a simulated recording head, fabricated of an electrically non-conducting material and geometrically closely approximating the dimensions of the actual recording head particularly such that the working surface of the simulated recording head possesses substantially the same dimensions and contours as the working surface of the actual head, said working surface of the simulated head having deposited thereon one or more thin strips of a magnetic alloy substantially similar to the magnetic alloy as used in said actual recording head, and observing the increase in electrical resistance of said magnetic alloy strip or strips.

DESCRIPTION OF THE PREFERRED EMBODIMENTS

Figure 1:
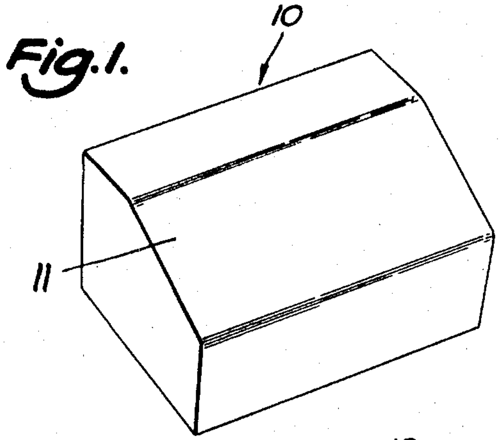

The simulated head used in the method of the invention is preferably fabricated from a durable, electrically non-conducting material such as alumina or nominally 97.5 percent recrystallised alumina, and is fine ground to the required dimensions with a general surface finish of approximately 25 micro in. but with the working surface polished to a finish of better than 20 micro in., more preferably better than 15 micro in.

The thin strips of magnetic alloy provided on the working surface of the simulated head preferably have a thickness in the range 700 to 1,000 A and are conveniently deposited by means of vacuum sublimation with the aid of an appropriate mask in order to obtain the same surface pattern as upon the actual recording head. The magnetic alloy should in accordance with the invention be substantially similar to the magnetic alloy as used in the actual recording head, and in practice it is found that nichrome having a composition of 80 percent nickel and 20 percent chromium is frequently suitable for the purpose because such an alloy has a hardness of approximately 175 $H_D$ which is similar to the hardness of materials used in commercial recording heads.

Vacuum sublimation of the magnetic alloy e.g., nichrome, is preferably carried out by sublimation from a heated wire in a vacuum chamber, this technique being preferred because it involves relatively low temperatures which help to maintain a constant alloy composition during deposition.

Changes in the electrical resistance of the strips of magnetic alloy, usually in the medium range, i.e., from about 0.1 to 50 ohms, may be determined by circuits for making continuous or intermittent measurements. Electrical connections between the strips of magnetic alloy and the resistance-measuring circuit are suitably made by means of conducting films deposited on the simulated recording head at each end of each strip of magnetic alloy. Preferably the conducting films are of gold which may be deposited by vacuum evaporation, desirably with the aid of a second mask.

It is to be understood that in another aspect the invention also provides a device suitable for use in the method of the invention which device comprises a simulated recording and/or reproducing head or the like as hereinbefore described. The invention also includes within its scope a magnetic tape transport system whenever fitted with such a device and magnetic tape whenever tested by the method of the invention.

The advantages of the device in accordance with the invention are, that its shape can be varied to reproduce the type of recording head encountered in a given application; that in operation it reproduces the geometrical relationship between the recording head and the magnetic tape; that it can be used to measure the wear of different types of recording head material; that the wear profile across the width of a recording head can be investigated by the deposition of several parallel thin strips of magnetic alloy; that it is sensitive to the removal of small amounts of material by short lengths of tape, and so can be used to detect variations in abrasiveness over such short lengths; and that it can be used in any normal tape transport system (for recording, reproducing, etc.).

Using the method and the equipment of this invention, we have found that, in addition to the rate of movement of the tape and the nature and particle size of the magnetic powder, the nature of the binder whereby the latter is made to adhere to the tape, and the temperature and relative humidity of the surrounding atmosphere, are important factors in determining the rate of wear of the recording head alloy. In particular, we have quantitatively established the existence of a wide degree of variation in the abrasiveness of different commercially available magnetic tapes to the same recording head alloy, and a substantial degree of such variation even between tape samples of the same commercial origin or over a single length of such tape. As between different types of tape, differential factors in wear rate of up to ten times or more are frequently observable.

Figure 2:
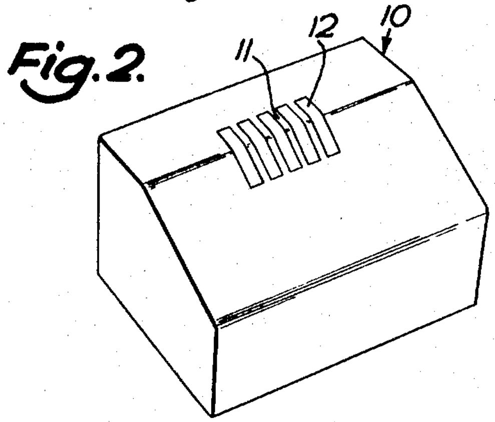
Figure 5:
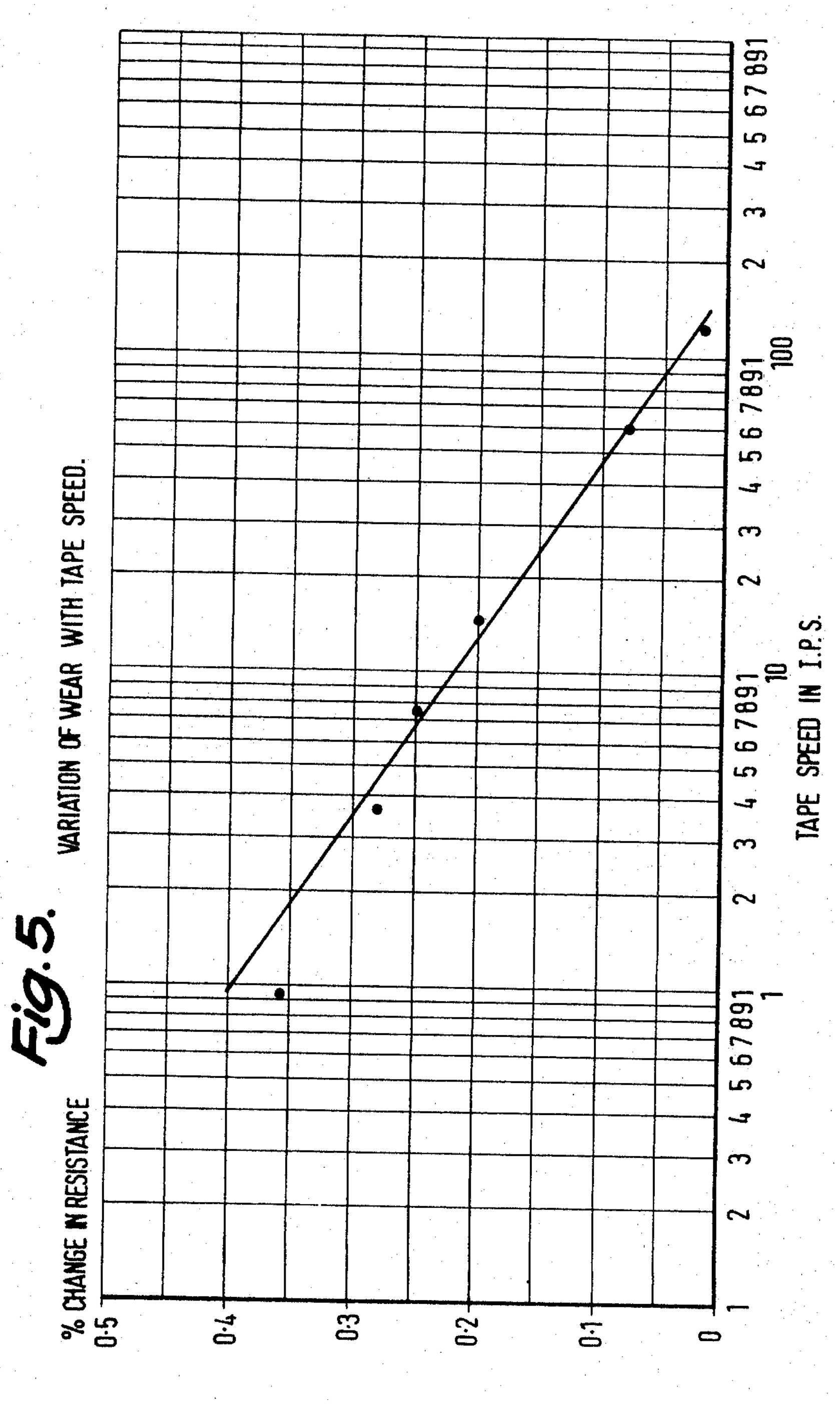
Figure 6:
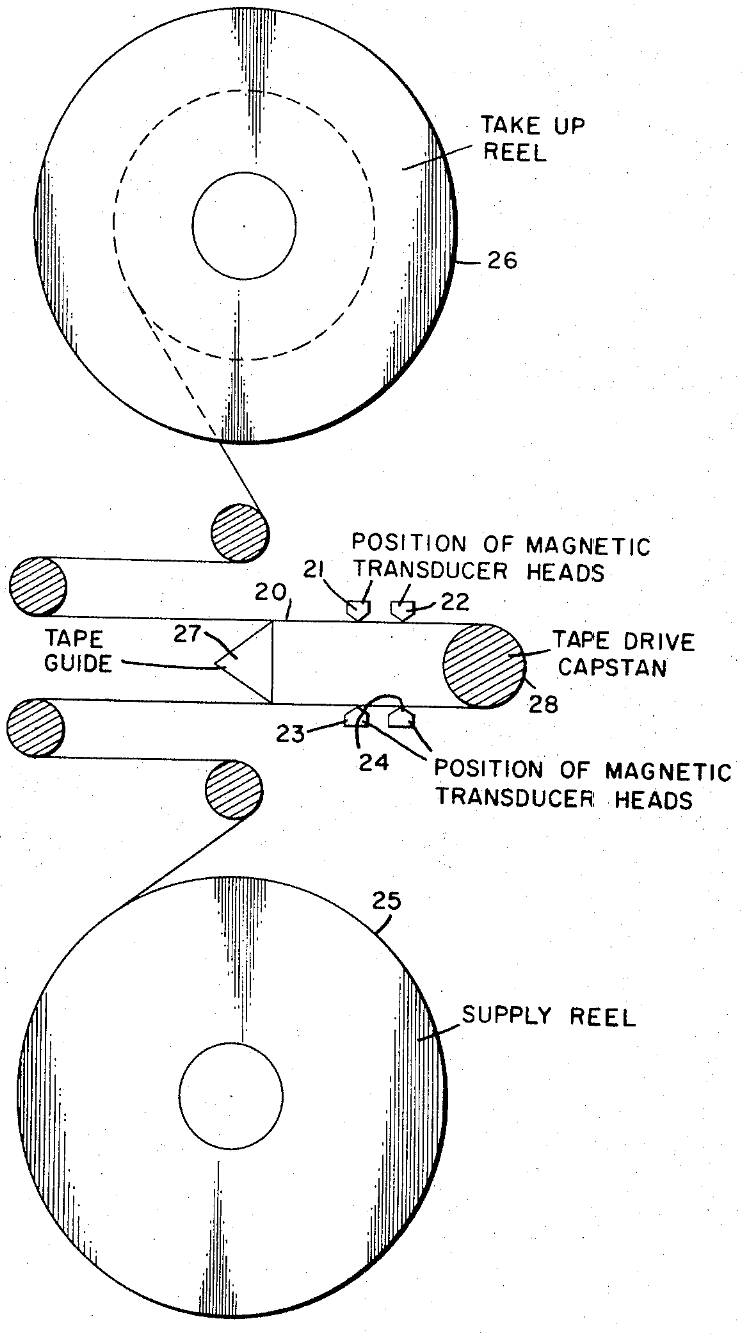

The invention will now be more particularly described and illustrated in the following Examples wherein reference will be made to the accompanying drawings. In Example 1 a simulated recording head, and the preparation thereof, in accordance with the invention is described with reference to FIGS. 1 to 3 which are diagrammatic illustrations of a simulated recording head at various stages in the preparation thereof. The measurement of the abrasiveness of magnetic tape by the method of the invention using a simulated head as exemplified in Example 1 is described in Example 2 with reference to FIGS. 4 and 5. FIG. 6 shows a standard tape transport system used in the practice of the invention.

EXAMPLE 1

A substrate 10 made from 97.5 percent recrystallised alumina is fine ground to the required dimensions with a surface finish of approximately 25 micro in. and the working surface 11 thereof, which is the eventual area of contact between the tape to be tested and the simulated head, is polished to a surface finish of better than 15 micro in. Nichrome having a composition of 80 percent nickel and 20 percent chromium and a hardness of approximately 175 $H_D$ is then deposited in the form of five parallel thin strips 12 onto the working surface 11 of the alumina substrate 10 heated to about 300° C, by sublimation from a heated wire in a vacuum chamber. The strips of nichrome 12 deposited thus, desirably have a thickness of from 700 to 1,000 A. The substrate 10 is then removed from the vacuum chamber and placed in a furnace where it is heat treated at 900° C in air for 1 hour, thus causing the nichrome to diffuse into the surface of the alumina. A further 1,000 A thick nichrome layer is then deposited as before on top of each existing strip 12, the substrate 10 again being heated to 300° C. After the second deposition of nichrome a final heat treatment is carried out in air at 300° C. which completes the preparation of the strips of magnetic alloy worn away during the testing of magnetic tape. In order to provide electrical contact with ancillary equipment for the measurement of changes in the electrical resistance of the nichrome strips 12, pairs of conducting gold films 13 are then deposited on the alumina substrate 10 by vacuum evaporation.

EXAMPLE 2

Figure 3:
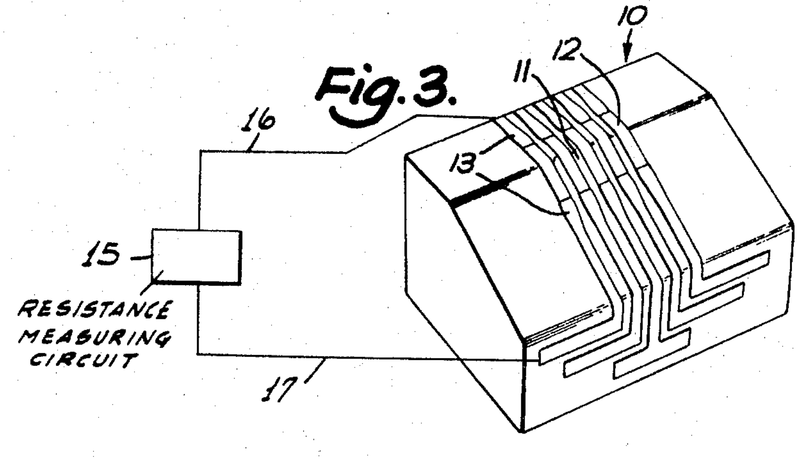
Figure 4:
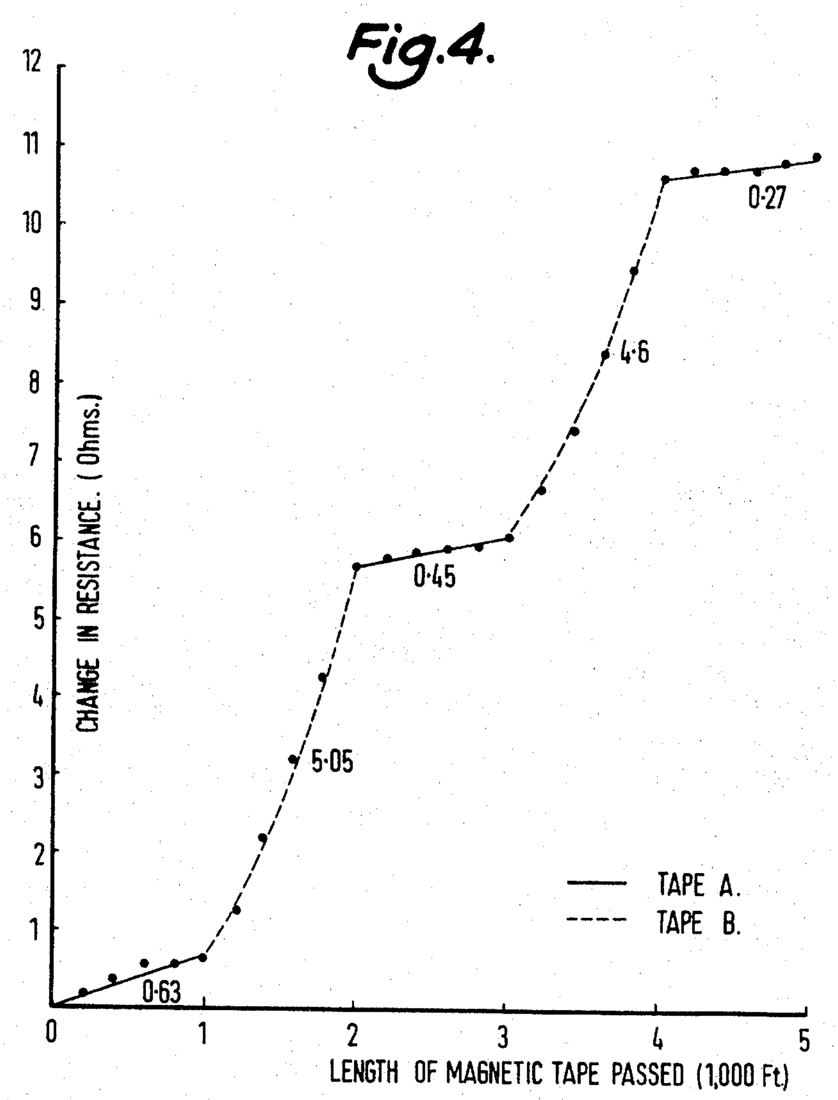

A simulated recording head as exemplified in Example 1 was fitted to a normal tape transport system such as shown in FIG. 6 and the gold films deposited on the head were connected to ancillary equipment for the measurement of changes in electrical resistance. In FIG. 6 magnetic tape 20 is shown being transported from supply reel 25 to take-up reel 26 around guide 27 and capstan 28 as is standard and known to those skilled in the art. The position of the transducer heads are denoted at 21, 22, 23 and 24 and the simulated test head can be mounted at any one of the four positions. This equipment was employed to provide a comparison in the degree of abrasiveness of two different magnetic tapes A and B such a comparison being effected by passing 1,000 ft. lengths of tapes A and B alternately over the working surface of the simulated head at a constant speed in each case. During the passage of each 1,000 ft. length of tape, the change in electrical resistance of the nichrome strips was noted at 200 ft. intervals. FIG. 3 shows the resistance measuring circuit 15 connected to conductors 13 by leads 16 and 17. Where more than one strip is used, each is connected with a resistance measuring circuit. FIG. 4 is a graph showing a plot of change in electrical resistance (at intervals of 200 ft.) versus length of tape passed over the head for alternate passages of 1,000 ft. of tapes A and B. In FIG. 4 the overall change in electrical resistance for each 1,000 ft. of tape passed is indicated adjacent to the relevant portion of the curve and it is observed from these figures that tape B is of the order of 10 times more abrasive than tape A.

Using the same tape transport system fitted with the simulated head, the variation of head wear with tape speed was investigated for another sample of magnetic tape. Equal lengths of the tape were passed over the simulated head at different tape speeds and the percentage change in electrical resistance of the nichrome strips was recorded for each particular speed. FIG. 5 is a plot of the percentage change in resistance versus the logarithm of tape speed and it is observed therefrom that for the passage of a given length of tape, head wear decreases as the tape speed increases.

We claim:

1. A method for the determination of the degree of abrasiveness of magnetic tape, which method comprises passing the magnetic tape substantially at a normal operating speed over the working surface of a simulated recording head, fabricated of an electrically non-conducting material and geometrically closely approximating the dimensions of an actual recording head, the working surface of the simulated recording head possessing substantially the same dimensions and contours as the working surface of the actual head, said working surface of the simulated head having deposited thereon one or more thin strips of a magnetic alloy substantially similar to the magnetic alloy used in the actual recording head, and measuring the increase in electrical resistance of said magnetic alloy strip or strips.

2. A method according to claim 1 wherein the simulated recording head is fabricated from alumina.

3. A method according to claim 1 wherein the surfaces of the simulated recording head are fine ground to the required dimensions with a surface finish of approximately 25 micro in.

4. A method according to claim 1 wherein the working surface of the simulated recording head is polished to a surface finish of better than 20 micro in.

5. A method according to claim 1 wherein the thin strips of magnetic alloy provided on the working surface of the simulated recording head have a thickness of from 700 to 1,000 A.

6. A method according to claim 1 wherein the thin strips deposited on the working surface of the simulated recording head are of nichrome.

7. A method according to claim 1 wherein conducting films are deposited on the simulated recording head at each end of each strip of magnetic alloy so that electrical connections may be made between the strips of magnetic alloy and a resistance-measuring means for measuring said increase in electrical resistance.

8. A method according to claim 1 wherein:

a. the simulated recording head is fabricated from alumina which is b. fine ground to the required dimensions with a surface finish of approximately 25 micro in. and the working surface thereof polished to a surface finish of better than 20 micro in.;

c. the thin strips of magnetic alloy provided on the working surface of the simulated recording head are of nichrome and have a thickness of from 700 to 1,000 A; and d. conducting gold films are deposited on the simulated recording head at each end of each strip of nichrome in order that electrical connections may be made between the said nichrome strips and resistance-measuring circuits.

9. A device for the determination of the degree of abrasiveness of magnetic tape, comprising a simulated recording head fabricated of an electrically non-conducting material and geometrically closely approximating the dimensions of an actual recording head, the working surface of the simulated recording head possessing substantially the same dimensions and contours as the working surface of the actual head, said working surface of the simulated head having deposited thereon one or more strips of a magnetic alloy substantially similar to the magnetic alloy which is used in said actual recording head.

10. A device according to claim 9 wherein:

a. the simulated recording head is fabricated from alumina which is b. fine ground to the required dimensions with a surface finish of approximately 25 micro in. and the working surface thereof polished to a surface finish of better than 20 micro in.;

c. the thin strips of magnetic alloy provided on the working surface of the simulated recording head are of nichrome and have a thickness of from 700 to 1,000 A; and d. conducting gold films are deposited on the simulated recording head at each end of each strip of nichrome in order that electrical connections may be made between said nichrome strips and a resistance-measuring means.

* * * * *